(No Model.)
C. W. SHEARER.
POTATO DIGGER.
No. 257,984.                    Patented May 16, 1882.
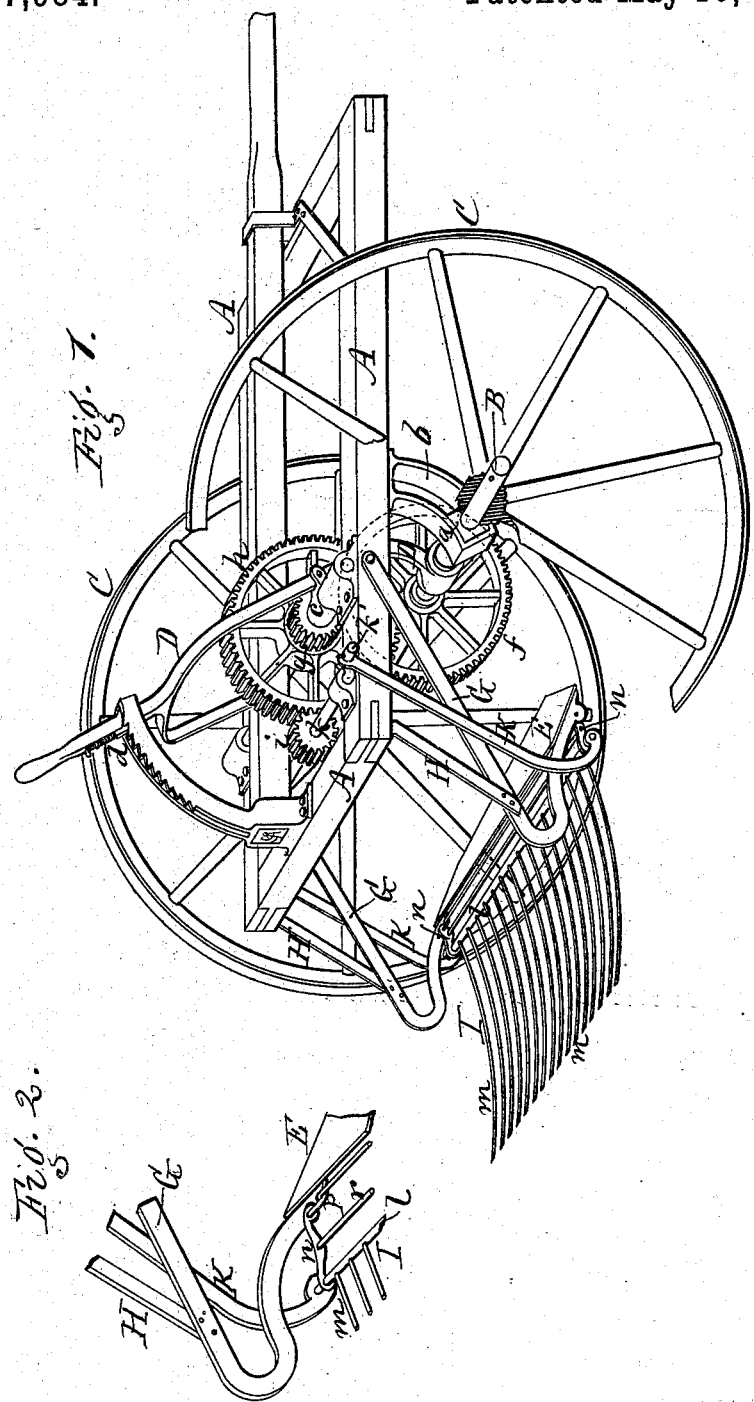
Witnesses:
Inventor:
Chas. W. Shearer,
pr R. F. Osgood,
atty.

UNITED STATES PATENT OFFICE.

CHARLES W. SHEARER, OF MENDON, NEW YORK.

POTATO-DIGGER.

SPECIFICATION forming part of Letters Patent No. 257,984, dated May 16, 1882.

Application filed March 27, 1882. (No model.)

*To all whom it may concern:*

Be it known that I, CHARLES W. SHEARER, of Mendon, Monroe county, New York, have invented a certain new and useful Improvement in Potato-Diggers; and I do hereby declare that the following is a full, clear, and exact description of the same, reference being had to the accompanying drawings, in which—

Figure 1 is a perspective view of the machine, a portion of one of the wheels being broken away. Fig. 2 is a detail view, also in perspective, showing a portion of the scoop, the grating, and their connecting parts.

My improvement relates to that class of mounted potato-diggers in which a scoop is used for digging the potatoes and a grating or raddle is used in the rear of the scoop for sifting and removing the potatoes from the dirt and leaving them free on the top of the ground.

The invention consists in the construction and arrangement of parts hereinafter specifically described and claimed.

In the drawings, A shows the main frame mounted on an axle, B, and provided with supporting-wheels C C. The ends of the axle rest in boxes *a a*, and these boxes are movable up and down in curved and slotted guides *b b*. The main frame, and with it the operating parts, are elevated and lowered on the axle by a curved lever, D, having its fulcrum at *c*, and secured at any adjustment by a ratchet and catch of common form. (Shown at *b*.)

*f* is a spur-gear on the axle, engaging with a spur-pinion, *g*.

*h* is a spur-gear on the same shaft with *g*, said spur-gear engaging with a spur-pinion, *i*, on a crank-shaft, *k*. By this crank-shaft the grating or shaker is operated, as will be presently described.

E is a scoop of triangular form, and standing downward in an inclined direction, by which the potatoes are dug from the ground. This scoop is attached firmly to the rear part of the main frame by arms G G at the sides and braces H H, as shown.

I is the grating or shaker in the rear of the scoop, and standing backward reversely to it. This grating consists of a shaft or head, *l*, standing crosswise, and a series of curved tines or rods, *m m*, standing longitudinally, as shown. The ends of the shaft or head are pivoted loosely in the ends of pitmen K K, and the opposite ends of the latter are jointed to the cranks *k' k'* of the shaft *k*.

*n n* are two links on opposite sides, jointed at one end to the shaft or head *l* and at the other end to hooks *p p* at the rear of the scoop, the links having a free movement on both bearings.

*r* is one or more cross-rods connecting the two links *n n*, and forming an open bridge over the space between the scoop and the grating, and preventing the potatoes dropping through at that point.

The operation is as follows: The scoop and the grating are elevated at their meeting ends, thus forming an obtuse V, the outer ends resting upon the ground. The potatoes and dirt elevated upon the scoop are thrown across the rods *r* upon the grating. At every revolution of the crank-shaft *k* the front or inner end of the grating will be raised and lowered, the outer end not being raised, but simply dragging upon the ground. This movement not only sifts out the dirt, but also throws out the potatoes in a row upon the ground.

I am aware that scoops and gratings of somewhat similar form have before been used in which the grating receives not only a vertically-vibrating movement at the inner end, but also at the outer end, the whole body having the same movement. The advantage of giving the vibration only to the inner end is that, by that means the outer end is not raised out of the dirt and the potatoes will not be buried by getting under the tines, and, furthermore, there is less tangling and clogging by the vines for the same reason. In this invention the dirt is sifted through while the potatoes are rolled out on top and above the rear dragging ends of the tines. To enable this peculiar movement to be given both ends of the links *n n* must have free turning movement on their bearings, and the ends of the cross-head *l* must also have free movement in the ends of the pitmen K K.

In this machine the whole grating or shaker rests under the surface of the ground. In other words, the earth in passing over the scoop is elevated so as to cover the shaker as it passes over. The outer ends of the tines rest near the surface, and the tines being of curved form the potatoes are worked outward and upward by the constant vertical vibration of the inner end of the shaker, so that by the time they reach the outer end of the shaker they are raised perfectly above the surface and left in a row. In other machines of this class the shaker rests above the ground and an imperfect clearing of potatoes from the dirt occurs. My machine differs from these in having the shaker work entirely under the surface.

Having thus described my invention, I do not claim broadly a grating or shaker in the rear of the scoop; but

What I claim as new, and desire to secure by Letters Patent, is—

The combination, with the scoop E and grating I, of the links $n\ n$, connecting the grating with the back of the scoop, and the pitmen K K, connecting the grating with the crank-shaft $k$, as shown and described, and for the purpose specified.

In witness whereof I have hereunto signed my name in the presence of two subscribing witnesses.

CHARLES W. SHEARER.

Witnesses:
  R. F. OSGOOD,
  Z. L. DAVIS.